United States Patent
Gabaldon

(10) Patent No.: US 11,564,478 B2
(45) Date of Patent: Jan. 31, 2023

(54) WRAPPING HAMMOCK

(71) Applicant: Walter Gabaldon, Albuquerque, NM (US)

(72) Inventor: Walter Gabaldon, Albuquerque, NM (US)

(*) Notice: Subject to any disclaimer, the term of this patent is extended or adjusted under 35 U.S.C. 154(b) by 16 days.

(21) Appl. No.: 17/324,005

(22) Filed: May 18, 2021

(65) Prior Publication Data

US 2022/0369798 A1    Nov. 24, 2022

(51) Int. Cl.
| | | |
|---|---|---|
| *A45F 3/24* | (2006.01) | |
| *A45F 3/22* | (2006.01) | |
| *A47G 9/02* | (2006.01) | |
| *F16M 13/02* | (2006.01) | |

(52) U.S. Cl.
CPC .............. *A45F 3/24* (2013.01); *A45F 3/22* (2013.01); *A47G 9/0215* (2013.01); *F16M 13/027* (2013.01)

(58) Field of Classification Search
CPC ........... A45F 3/24; A45F 3/22; A47G 9/0215; A47G 9/0207; A47D 7/04; A47D 7/00; A47D 9/02; A47D 9/00; F16M 13/027; F16M 13/02
USPC ....................... 5/127–130, 120–122
See application file for complete search history.

(56) References Cited

U.S. PATENT DOCUMENTS

| | | | | | |
|---|---|---|---|---|---|
| 1,559,303 | A * | 10/1925 | Bates | .................. | A47D 9/02 5/103 |
| 2,220,330 | A * | 11/1940 | Hilger | .................. | A45F 3/22 5/120 |
| 4,375,110 | A * | 3/1983 | Murphy | .................. | A47D 9/00 403/291 |
| 4,550,456 | A * | 11/1985 | Allen | .................. | A47D 9/02 5/99.1 |
| 5,113,537 | A * | 5/1992 | Turk | .................. | A45F 3/24 5/127 |
| D328,828 | S * | 8/1992 | Turk | .................. | D6/389 |
| 5,170,520 | A * | 12/1992 | Milliken | .................. | A47D 9/02 5/98.1 |
| 5,511,258 | A * | 4/1996 | Barr, Sr. | .................. | A47D 9/00 5/104 |
| 7,367,068 | B2 * | 5/2008 | Huff | .................. | A45F 3/22 5/120 |
| 7,861,337 | B1 * | 1/2011 | Patel | .................. | A47D 9/02 5/101 |

(Continued)

*Primary Examiner* — Robert G Santos
(74) *Attorney, Agent, or Firm* — Lyman Moulton, Esq.; Moulton Patents, PLLC

(57) ABSTRACT

The Wrapping Hammock is the only product of its kind that imitates a mother's womb environment providing a tight wrap around a child for comfort. Also known as "The Next To Me Baby Hammock," the disclosure is uniquely designed with a breathable, durable, hammock material to guarantee babies have a familiar and safe sleeping experience. The disclosure includes a sheet gathered at a first end attached to a first point and gathered at a second end attached to a second point. The disclosure also includes a high durometer lengthwise wiring looping from the first point to the second point and configured to provide a lengthwise antibunching characteristic. The disclosure additionally includes a suspension cord attached to the first end and to the second end. The disclosure further includes a stand comprising a free standing arm and an anchor attached thereto configured to suspend the hammock system therefrom.

19 Claims, 3 Drawing Sheets

(56) References Cited

U.S. PATENT DOCUMENTS

| | | | |
|---|---|---|---|
| 9,314,090 B1* | 4/2016 | Manning | E04H 15/04 |
| 2003/0140417 A1* | 7/2003 | Huff | A45F 3/22 |
| | | | 5/120 |

* cited by examiner

WRAPPING HAMMOCK

BACKGROUND OF THE INVENTION

A newborn baby is unlikely to sleep through the night before they are four to six months old, creating a stressful and possible sleep depriving situation for many parents. Finding solutions to calm a fussy baby at night can be an incredibly difficult and a time-consuming process. There have been no products available as original equipment or as an aftermarket to address this problem.

An apparatus to simplify the process of getting your baby to sleep and a higher chance of the baby sleeping through the night is presently unavailable. There exists a need for a versatile hammock product that is not being met by any known or disclosed device or system of present.

BRIEF SUMMARY OF THE INVENTION

The main purpose of the disclosed Wrapping Hammock is to mimic a womb environment via a hammock for babies to ensure long, restful sleep. Also known as the Next To Me Baby Hammock, the disclosure introduces a novel baby hammock layout that provides a means to tightly wrap an infant, in order to mirror the womb experience where babies feel the most comfortable and secure.

The disclosure includes a sheet gathered at a first end attached to a first point and gathered at a second end attached to a second point. The disclosure also includes a high durometer lengthwise wiring looping from the first point to the second point and configured to provide a lengthwise antibunching characteristic. The disclosure additionally includes a suspension cord attached to the first end and to the second end. The disclosure further includes a stand comprising a free standing arm and an anchor attached thereto configured to suspend the hammock system therefrom.

Figure 1:
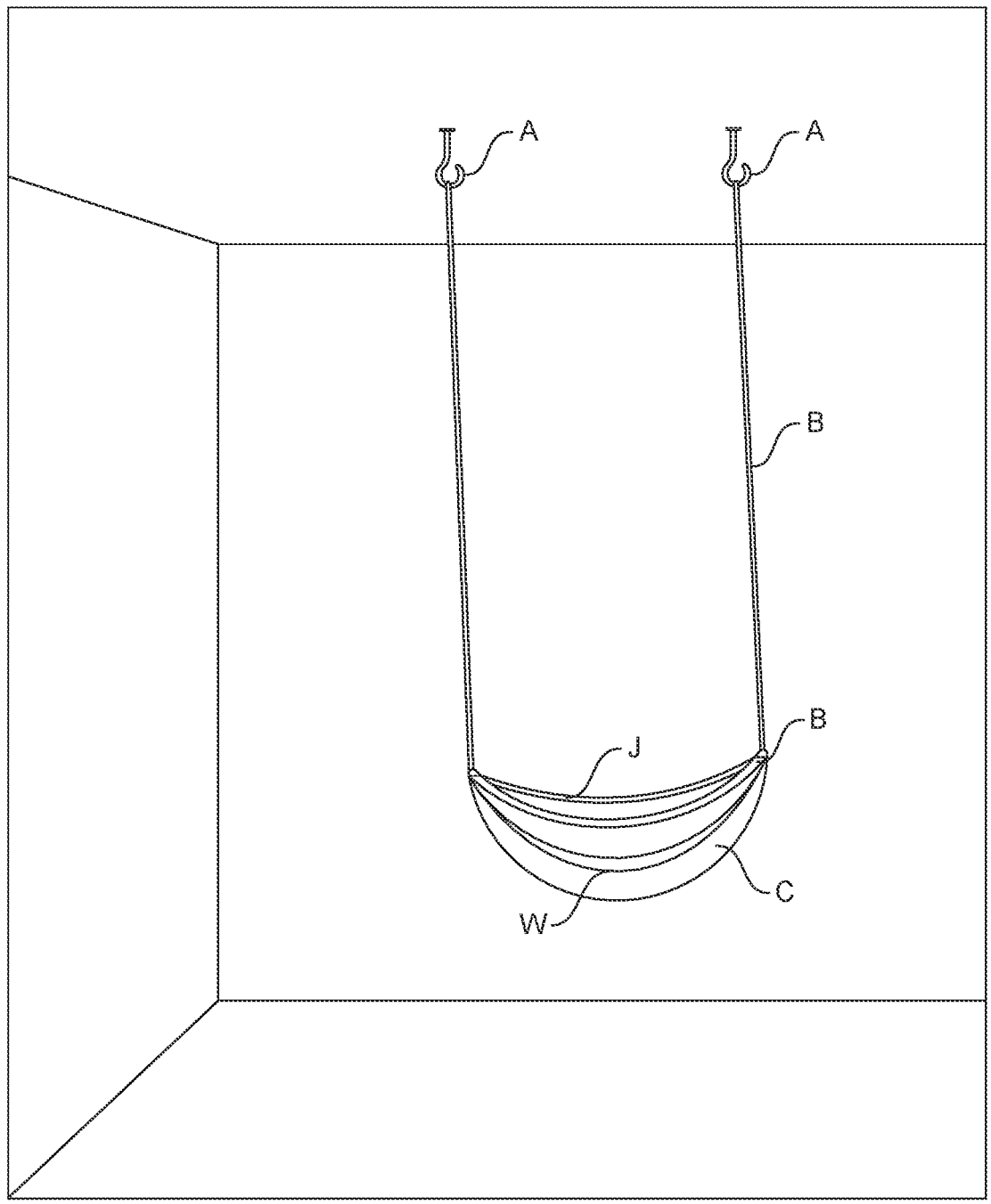
FIG. 1 is a front perspective view of a two hook Wrapping Hammock in accordance with an embodiment of the present disclosure.

Throughout the description, similar reference numbers may be used to identify similar elements depicted in multiple embodiments. Although specific embodiments of the invention have been described and illustrated, the invention is not to be limited to the specific forms or arrangements of parts so described and illustrated. The scope of the invention is to be defined by the claims appended hereto and their equivalents.

DETAILED DESCRIPTION OF THE INVENTION

Reference will now be made to exemplary embodiments illustrated in the drawings and specific language will be used herein to describe the same. It will nevertheless be understood that no limitation of the scope of the disclosure is thereby intended. Alterations and further modifications of the inventive features illustrated herein and additional applications of the principles of the inventions as illustrated herein, which would occur to one skilled in the relevant art and having possession of this disclosure, are to be considered within the scope of the invention.

FIG. 1. Is a front perspective view of the Wrapping Hammock showing: A. Ceiling anchors, B., Wired materials sewn into the fabric trims and attached to anchors, and C. Hammock made of breathable and durable materials in accordance with an embodiment of the present disclosure. The view also includes a perimeter frame J attached lengthwise to the hammock sheet C. The view additionally includes a high durometer lengthwise looped wiring W designed to provide a lengthwise antibunching characteristic to the hammock and sheet thereof.

Figure 2:
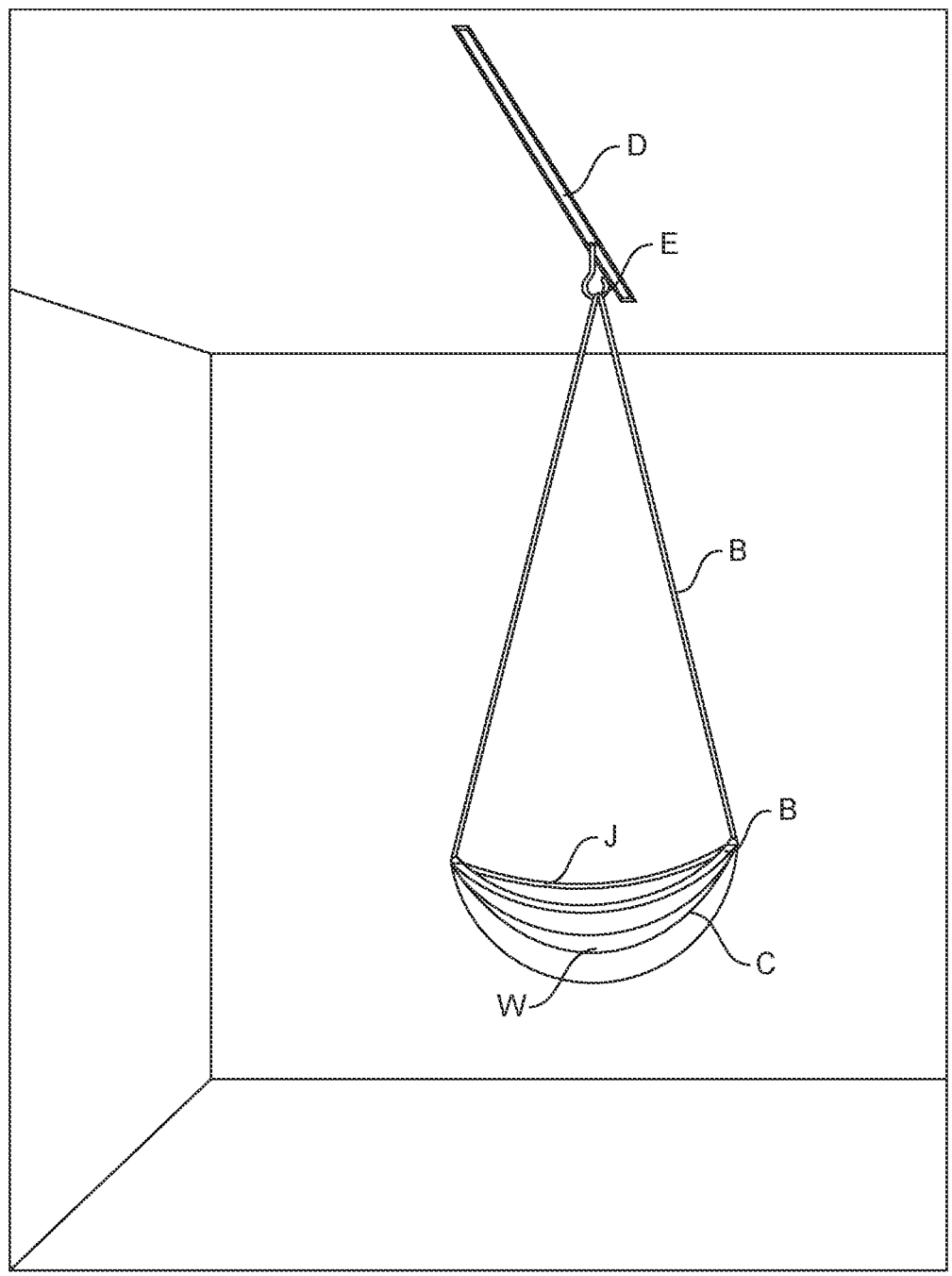
FIG. 2. Is a front perspective view of a one hook and track Wrapping Hammock in accordance with an embodiment of the present disclosure.

FIG. 2. Is a front perspective view of the Wrapping Hammock showing: B., Wired materials sewn into the fabric trims and attached to anchors, C. Hammock made of breathable and durable materials, D. Ceiling track, and E. Sliding hook in accordance with an embodiment of the present disclosure. The view also includes a perimeter frame J attached lengthwise to the hammock sheet C. The view additionally includes a high durometer lengthwise looped wiring W designed to provide a lengthwise antibunching characteristic to the hammock and sheet thereof.

Figure 3:
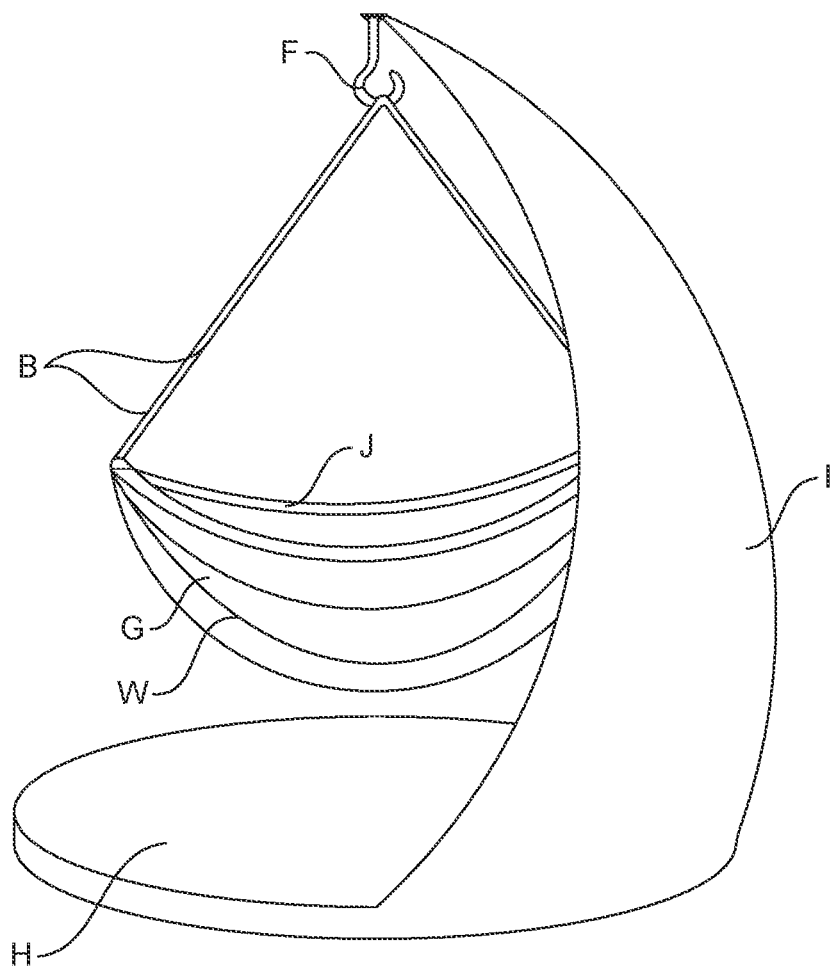
FIG. 3. Is a side perspective view of a free standing one hook Wrapping Hammock in accordance with an embodiment of the present disclosure.

FIG. 3. Is a side perspective view of the Wrapping Hammock showing: B., Wired materials sewn into the fabric trims and attached to anchors, F. Stand hook 3'-4' high, G. Hammock made of breathable and durable materials 2' above the ground, H. Padded base and I. Portable and durable stand, in accordance with an embodiment of the present disclosure. The view also includes a perimeter frame J attached lengthwise to the hammock sheet C. The view additionally includes a high durometer lengthwise looped wiring W designed to provide a lengthwise antibunching characteristic to the hammock and sheet thereof.

Expanding on the initial design of a hammock, the Next To Me Baby Hammock is attached to a portable, durable stand and wired material that is sewn into the fabric trims, latches onto ceiling anchors and tracks. The stand hook located on the top of the stand securely attaches onto the hammock to ensure all aspects are adequately held into place and are stable. The hammock hovers over a padded base in a spherical shape to act as an extra safety measure and ensures babies are protected at all times. The Next To Me baby Hammock is easily movable and adjustable and is intended for new born babies to children of up to two years of age. The Next To Me Baby Hammock ensures a fully operational baby bed that can be easily placed in a parents bedroom and may reduce the likelihood of child discomfort at night.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

What is claimed is:
1. A hammock comprising:
   a two point hammock comprising a high durometer lengthwise looped wiring from a first point of the two points to a second point of the two points; and
   a sheet gathered at a first end attached to the first point and gathered at a second end attached to the second point, wherein the hammock resists bunching lengthwise due to the high durometer lengthwise looped wiring configured to wrap widthwise around an occupant.

2. The hammock of claim 1, further comprising a first suspension cord attached to the first point and a second suspension cord attached to the second point.

3. The hammock of claim 1, further comprising a first ceiling anchor for the first point and a second ceiling anchor for the second point via two suspension cords.

4. The hammock of claim 1, further comprising a single anchor for both the first point and the second point via a single suspension cord.

5. The hammock of claim 1, further comprising a single anchor slidably received into a track for both the first point and the second point via a single suspension cord.

6. The hammock of claim 1, further comprising a single anchor received into a single hook in a free standing stand for a single suspension cord attached to the first point and to the second point.

7. The hammock of claim 1, further comprising an elliptical perimeter frame affixed lengthwise to the sheet perimeter to provide an antibunching characteristic in the lengthwise dimension.

8. The hammock of claim 1, further comprising a breathable and a durable material comprising the sheet.

9. The hammock of claim 1, wherein the high durometer lengthwise looped wiring is sewn into the sheet.

10. A hammock apparatus comprising:
a sheet gathered at a first end attached to a first point and gathered at a second end attached to a second point;
a high durometer lengthwise wiring looping from the first end to the second end; and
a suspension cord attached to the first end and to the second end,
wherein the hammock apparatus resists a lengthwise bunching due to the high durometer lengthwise looped wiring.

11. The hammock apparatus of claim 10, further comprising a stand for the hammock apparatus, the stand configured to suspend the hammock apparatus in a free standing architecture.

12. The hammock apparatus of claim 10, wherein the suspension cord comprises a first portion and a second portion, the first portion attached to the first point and a first ceiling anchor and the second portion attached to the second point and a second ceiling anchor.

13. The hammock apparatus of claim 10, wherein a middle portion of the suspension cord is hooked on a ceiling anchor.

14. The hammock apparatus of claim 10, wherein a middle portion of the suspension cord is hooked on a ceiling anchor slidably received into a track.

15. The hammock apparatus of claim 10, wherein a middle portion of the suspension cord is hooked on a free standing arm of a free standing stand.

16. The hammock apparatus of claim 10, further comprising a free standing stand for the hammock apparatus, an upper portion of a base thereof comprising a padding.

17. The hammock apparatus of claim 10, further comprising an elliptical perimeter frame affixed lengthwise to a perimeter of the sheet to provide an antibunching characteristic in the lengthwise dimension of the hammock apparatus.

18. A hammock system comprising:
a sheet gathered at a first end attached to a first point and gathered at a second end attached to a second point;
a high durometer lengthwise wiring looping from the first point to the second point and configured to provide a lengthwise antibunching characteristic;
a suspension cord attached to the first end and to the second end;
a stand comprising a free standing arm and an anchor attached thereto configured to suspend the hammock system therefrom.

19. The hammock system of claim 18, further comprising an elliptical perimeter frame attached to a perimeter of the sheet.

* * * * *